United States Patent [19]

Ogasawara et al.

[11] Patent Number: 4,633,739
[45] Date of Patent: Jan. 6, 1987

[54] SYSTEM FOR CONTROLLING AUTOMATIC TRANSMISSION HAVING COMMUNICATION CONTROL VALVE MEANS

[75] Inventors: Tsunehiko Ogasawara, Kariya; Yoshichika Arakawa, Nagoya; Koji Sumiya, Nishio; Yoshikazu Sakaguchi, Anjo, all of Japan

[73] Assignees: Aisin Seiki Kabushiki Kaisha; Aisin Warner Kabushiki Kaisha, both of Aichi, Japan

[21] Appl. No.: 594,291

[22] Filed: Mar. 28, 1984

[30] Foreign Application Priority Data

Mar. 31, 1983 [JP] Japan .................................. 58-57495

[51] Int. Cl.⁴ .............................................. B60K 41/06
[52] U.S. Cl. ........................................ 74/869; 74/864; 74/865
[58] Field of Search ................. 74/869, 864, 865, 867, 74/868

[56] References Cited

U.S. PATENT DOCUMENTS

| | | | |
|---|---|---|---|
| 3,505,910 | 4/1970 | Shimosaki | 74/864 |
| 3,546,973 | 12/1970 | Ohie et al. | 74/864 X |
| 3,667,323 | 6/1972 | Irie | 74/864 X |
| 3,710,652 | 1/1973 | Miyazaki | 74/869 X |
| 3,842,693 | 10/1974 | Oberpichler | 74/864 |
| 4,308,765 | 1/1982 | Iwanaga et al. | 74/869 |
| 4,334,441 | 6/1982 | Iwanaga et al. | 74/869 X |
| 4,467,675 | 8/1984 | Sugano et al. | 74/869 |
| 4,481,877 | 11/1984 | Takano et al. | 74/869 X |

FOREIGN PATENT DOCUMENTS

2153907 5/1973 Fed. Rep. of Germany ........ 74/867

Primary Examiner—Kenneth J. Dorner
Assistant Examiner—Dwight G. Diehl
Attorney, Agent, or Firm—Burns, Doane, Swecker & Mathis

[57] ABSTRACT

The transmission of the invention is capable of attaining a plurality of shift ranges by locking and releasing one or more elements of a gear mechanism to a casing of the transmission or by connecting and releasing the elements with the input shaft, the output shaft or into and out of engagement with each other. The control system for controlling the action of the elements of the gear set is a hydraulic control system having friction elements which achieve a higher speed range and a lower speed range of the transmission upon actuation by servo valves. An additional servo valve is included to work in opposition to one of the other servo valves and communicates with another of the servo valves. A communication control valve is disposed in a hydraulic line which communicates with another of the servo valves and with the servo valve acting in opposition so as to control the communication between these valves in response to a signal pressure developed by a signal pressure valve.

7 Claims, 5 Drawing Figures

SYSTEM FOR CONTROLLING AUTOMATIC TRANSMISSION HAVING COMMUNICATION CONTROL VALVE MEANS

FIELD OF THE INVENTION

The present invention relates to a system for controlling an automatic transmission, and in particular, to an system for controlling a multistep automatic transmission for vehicle in which at least two transmission shift ranges may be selectively attained between an input and output shafts.

BACKGROUND OF THE DISCLOSURE

There is an automatic transmission equipped with a gear mechanism (e.g. planetary gear sets) having elements and a plurality of friction engaging means therefor for attaining a plurality of shift ranges by locking and releasing any one or more of the elements of the gear mechanism, which is disposed between an input shaft and an output shaft, to and from a case, by bringing the elements into and out of engagement with the input shaft or the output shaft, or into and out of engagement with each other. In order to achieve a down shift such as kickdown from a higher (e.g., third speed) to a lower (e.g., second speed) shift range the first fricton engaging means is brought into disengagement with the engagement of the second friction engaging means. This gear shift may involve a large shock if appropriate timing between the disengagement of the first friction engaging means and the engagement of the second friction engaging means is not controlled.

The timing between the engagement of the first engaging means and the disengagement of the second engaging means has heretofore been controlled by means of a one-way clutch in the automatic transmission, an accumulator in a hydraulic control system for the automatic transmission or a timing valve which controls the supply sequence of the working fluid to the hydraulic servos, all of which involve considerable complication of the mechanical structure of the automatic transmission and the hydraulic control system.

SUMMARY OF THE DISCLOSURE

It is therefore an object of the present invention to provide a novel system for hydraulically controlling the automatic transmission of the type which comprises:
 a first and a second hydraulic servo each for actuating a first and a second friction engaging means, respectively, and
 a third hydraulic servo which is disposed to act opposing to the second hydraulic servo and is communicated with the second hydraulic servo.

It is another object of the present invention to provide a system having a relatively simple structure for hydraulically controlling the automatic transmission of the type herein above mentioned.

It is a further object of the present invention to provide a system for hydraulically controlling the automatic transmission in which an appropriate timing of the operation of two friction engaging means may be provided.

It is a further object of the present invention to provide a system for hydraulically controlling the automatic transmission in which the timing of the shifting to a lower speed range (high reduction ratio) may be appropriately changed in response to engine operation conditions such as engine output.

Other objects will become apparent in the entire disclosure.

The purpose of the present invention can be accomplished by providing a system for hydraulically controlling an automatic transmission equipped with a gear mechanism having elements and a plurality of friction engaging means therefor for attaining a plurality of shift ranges by locking and releasing any one or more of the elements of the gear mechanism, which is disposed between an input shaft and an output shaft, to and from a case, by bringing the elements into and out of engagement with the input shaft or the output shaft, or into and out of engagement with each other, comprising:
 a first and a second friction engaging means which take part in achieving two or more speed ranges comprising a higher speed range and a lower speed range;
 the first friction engaging means taking part in achieving a gear train of the higher speed range between said input and output shafts, and the second friction engaging means taking part in achieving a gear train of the lower speed range;
 a first and a second hydraulic servo means for actuating the first and the second friction engaging means, respectively;
 a third hydraulic servo means which is disposed to act opposing to said second hydraulic servo means and is communicated with the first hydraulic servo means;
 a hydraulic pressure source for generating a hydraulic pressure;
 a regulator valve for regulating the hydraulic pressure from the hydraulic pressure source into a given pressure;
 a first signal hydraulic pressure valve for generating a first signal pressure related with the operation conditions of an engine for driving said input shaft, said conditions including at least output of the engine;
 shifting valves for selectively supplying the hydraulic pressure from the regulator valve to respective servo means of said friction engaging means;
 a hydraulic line communicating the first hydraulic servo with the third hydraulic servo; and
 a communication control valve means, disposed in said hydraulic line, for controlling the communication therebetween in response to at least the first signal pressure from the first signal pressure valve.

The communication control valve means includes an orifice control valve. The orifice control valve may be one having a spool which is normally biased by a spring in one direction. The spool is displaced by a signal pressure representative of the engine operating conditions including at least output thereof, which signal pressure is, e.g., one from the first throttle signal pressure valve acting against the biasing force of the spring to control the communication between the first and third servos.

The gear shifting from the higher to the lower speed range is achieved by the disengagement of the first friction engaging means and the engagement of the second friction engaging means. When the signal pressure is so high to displace the spool to diminish the communication, the hydraulic fluid within the third servo of the second friction engaging means may be gradually exhausted via the communication control valve to the first servo of the first friction engaging means. Accordingly appropriate timing between the engagement of the second friction engaging means and the disengagement of the first friction engaging means is attained so that the shock which often occurs at the time of down shifting under high signal (e.g., throttle) pressure may be mitigated.

The communication control valve means is urged to close as the signal pressure becomes high. The communication control valve means includes a bypass flow rate control valve which is, e.g., connected in a parallel relationship with the orifice control valve. The third servo is exhausted via the bypass flow rate control valve to the first servo when the orifice control valve is closed.

The flow rate control valve may comprise, e.g., a check valve which allows only the fluid to flow to the third servo and an orifice which is parallel to the check valve. The third servo is preferably provided as an exhaust chamber of the second servo.

Different timings may be freely set by the provision of a plurality of pairs the communication control valve means, i.e., pairs of a flow rate control valve and an orifice control valve.

Furthermore, the control range in which the most favorable timing is attained by providing the orifice control valve with a function of continuously changing the communication degree of the first and third servos. The orifice control valve may be applied with an additional (second) signal pressure representative of other factors corresponding to the vehicle running conditions (e.g., vehicle speed) or the other engine operating conditions, which measure provides a more definite control of the timing.

The system of the present disclosure is also applicable to the timing controls for the down shiftings between two different speed ranges by appropriately modifying the structure of the transmission though the preferred embodiment is disclosed as that from the 3rd to the 2nd speed range.

DETAILED DESCRIPTION OF THE PREFERRED EMBODIMENTS

The present invention will be described by way of an embodiment shown in the drawings presented for better illustration and not for limitative purpose. It should be noted that modifications apparent in the art may be made without departing from the gist of the present disclosure.

Figure 1:
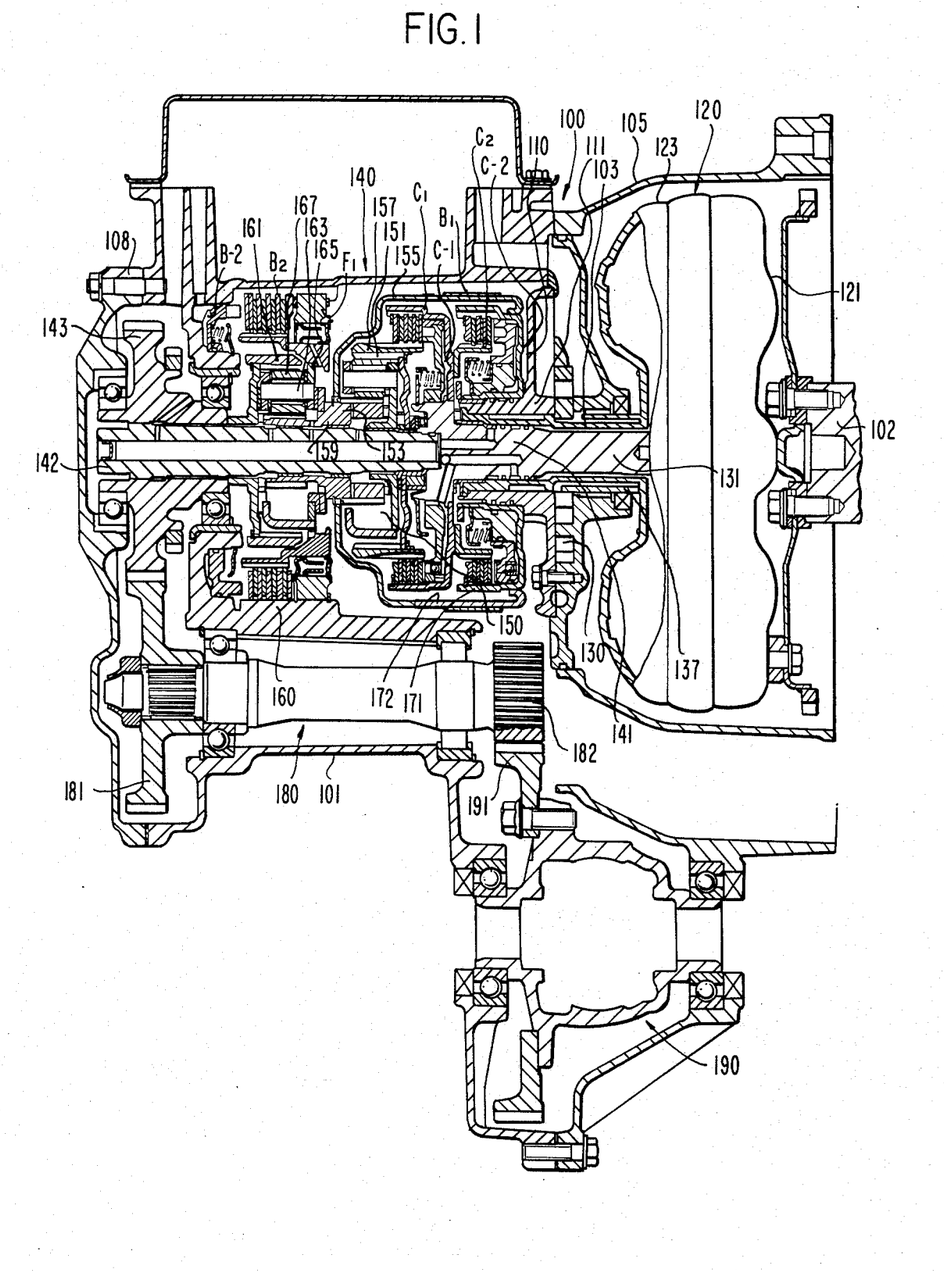
FIG. 1 is a cross-sectional view shoing an automatic transmission for a vehicle.

Referring now to FIG. 1, there is shown an automatic transmission for a vehicle comprising an automatic transmission casing 100 which is a stationary member, a torque convertor 120 which is a fluid coupling, a planetary gear transmission mechanism 140 which is a combination of planetary gear gets (comprising elements) and a plurality of friction engaging means, a countershaft 180 and a differential gear 190.

The transmission casing 100 comprises a transmission case 101 which accomodates the planetary gear transmission mechanism 140 and the countershaft 180, a case (engine side case) 105 fastened to the transmission case 101 at the input (engine) side thereof and enclosing the torque convertor 120 in which a fluid coupling is accomodated and a differential gear 190, and a gear cover 108 fastened to the transmission case 101 on the side opposite to the engine.

Figure 3:
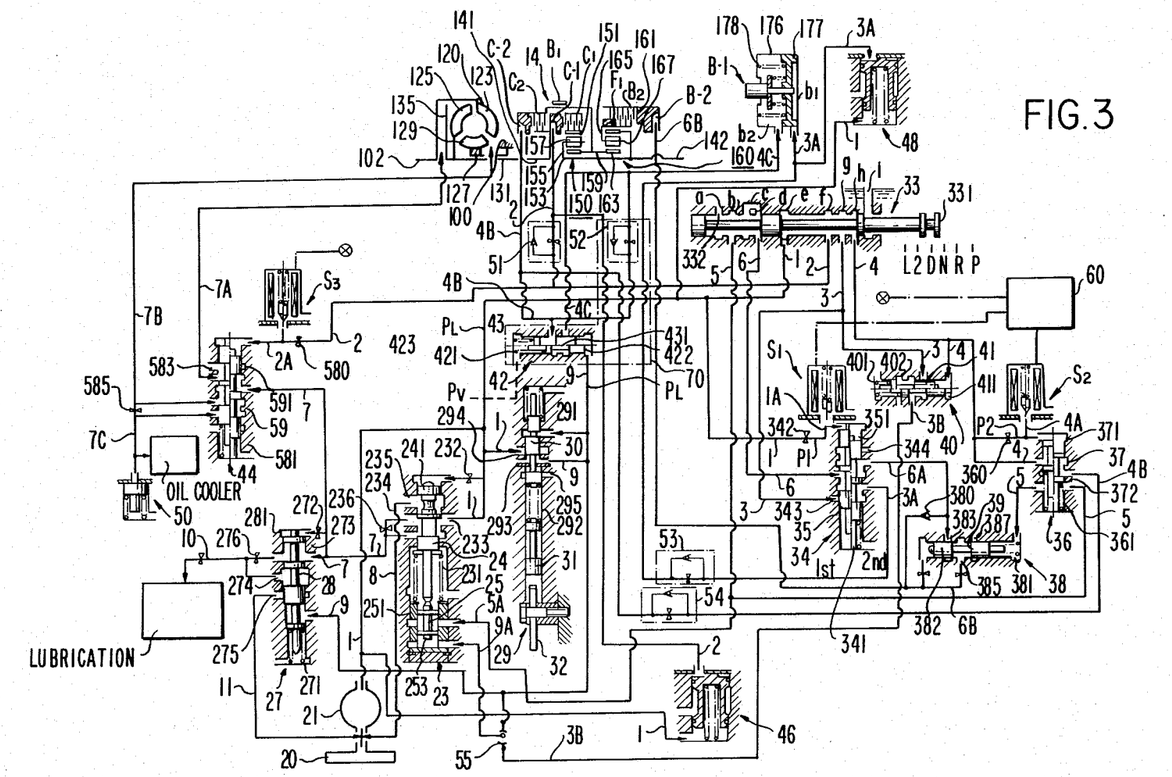
FIG. 3 is a diagram showing the hydraulic circuit of the control system for the automatic transmission of the present invention.

As shown in FIG. 3 the torque convertor 120 which per se is conventional comprises a front cover 121 connected with an engine output shaft 102, a pump impeller shell 123 connected with the front cover 121, a turbine runner 125 disposed between the impeller 123 and the front cover 121, a stator 129 supported via a one-way clutch 127 by a sleeve 103 secured to the automatic transmission casing 100, an output shaft 131 of the torque convertor extending through the sleeve 103 and a lockup clutch 135 between the front cover 121 and the turbine runner 125. A drive sleeve 137 for driving the hydraulic pump 21 is disposed along the axis of the pump impeller 123 surrounding the outer periphery of the sleeve 103.

Figure 2:
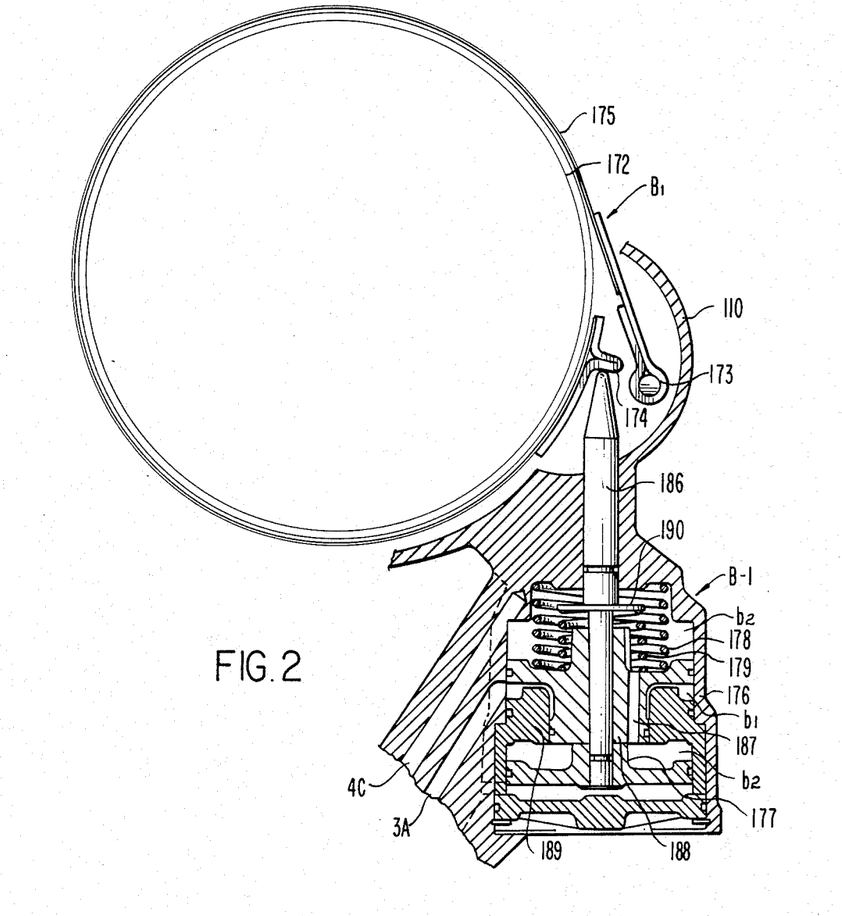
FIG. 2 is a cross-sectional view showing a brake which is incorporated in the transmission shown in FIG. 1.

The planetary gear transmission 140 is equipped with first and second planetary gear sets 150, 160 between an input shaft 141 integral with the torque converter output shaft 131, and an output shaft 142 disposed in series with the input shaft 141, a multidisc clutch C1 actuated by a hydraulic servo C-1, a multidisc clutch C2 (the first friction engaging means) actuated by a hydraulic servo C-2, a band brake B1 (the second friction engaging means) actuated by a hydraulic servo mechanism B-1 shown in FIG. 2, a multidisc brake B2 actuated by a hydraulic servo B-2, and a one-way clutch F1.

The first planetary gear set 150 comprises a ring gear 151 connected with the input shaft 141 via the clutch C1, a carrier 155 splined on the output shaft 142, a sun gear 153 connected with the input shaft 141 via the one-way clutch C2 and the band brake B1, and a planetary gear 157.

The second planetary gear set 160 comprises a ring gear 161 splined on the output shaft 142, a carrier 165 which may be locked to the transmission casing 100 via the brake B2 and the one-way clutch F1 parallel thereto, a sun gear 163 which may be connected with the input shaft 141 via the clutch C2 and the brake B1 and a planetary gear 167. The sun gears 153 and 163 of the first and second planetary gear sets 150 and 160 are disposed on an integral sun gear shaft 159 in the present embodiment.

The band brake B1 includes a brake drum 172 and a brake band 175, and actuated by the hydraulic servo mechanism B-1. The brake drum 172 has one end welded to the outer periphery of an annular cylinder 171 of the hydraulic servo C-2 and the other end splined on the sun gear shaft 159. The cylinder 171 is rotatably fitted on the outer periphery of a sleeve-like boss 111 on an oil pump cover 110 of the transmission casing. The brake drum 172 is disposed to accommodate the clutches C1 and C2 and the first planetary gear set 150. The brake band 175 has one end hinged to the transmission casing with the other end being free and provided with a stopper 174. The brake band 175 encircles the brake drum 172.

The body of the hydraulic servo mechanism B-1 comprises a cylinder 176 integral with the oil pump cover 110 of the case 100, two pistons 177 and 188 slidably disposed in the cylinder 176, and a push rod 186 having one end secured to the outer piston 177 and the other end abutting to the stopper 174 of the brake band 175, said rod extending through the inner piston 188, and a return spring 178 for normally biasing the push rod 186 in turn, the pistons 177 and 188 away from the stopper 174.

An auxiliary cylinder 189 is fitted into the cylinder 176. The portion of the inner piston 188 having a large diameter is in a slide-contact with the inner wall of the cylinder 176 and the portion of the inner piston 188 having a small diameter is in a slide-contact with the inner wall of the auxiliary cylinder 189. The piston 177 is slidably disposed in the cylinder 189. An anchoring spring 179 is disposed between the inner piston 188 and a collar 190 in the middle of the push rod 186 for normally biasing the piston 188 upon the piston 177.

The hydraulic servo mechanism B-1 comprises a second hydraulic servo b1 and a third hydraulic servo b2 (exhaust chamber with respect to b1) which is disposed in opposition thereto. The second hydraulic servo b1 is communicated with the line 3A and is driven by the hydraulic pressure supplied to a chamber between the cylinder 189 and the inner piston 188. The inner piston is displaced inwards against the return spring 178. Accordingly, the push rod is in turn biased inwards via the anchoring spring 179 to press the stopper projection 174 for engaging the brake B1. The servo b2 for disengaging the brake B1 is communicated with the line 4C. The servo b2 comprises a first chamber in which two springs are disposed and a second chamber disposed between the cylinder 189 and the outer piston 177 the second chamber being communicated with the first chamber via a passage 187. When a hydraulic pressure is introduced into these chambers via the line 4C the piston 177, thus the rod 186 is retracted to disengage the brake B1. Simultaneously with this the fluid in the second servo b1 is discharged via a line 3A. Thus the servos b1 and b2 operate complementarily each other. The hydraulic servo mechanism B-1 is of double piston type. This results in compact size and smooth disengagement of the brake B1 even when the pressure is applied to the third hydraulic servo while the pressure is supplied to the second hydraulic servo b1.

A countershaft drive gear 143 which is splined on the output shaft 142 at the opposite end thereof is meshed with a counter shaft driven gear 181 which is splined on the countershaft 180 at one end thereof.

The countershaft 180 is provided with a differential drive gear 182 at one end close to the engine, the gear 182 meshing with an input large gear 191 of the differential mechanism 190.

FIG. 3 shows a hydraulic control system of this automatic transmission which is shown in FIGS. 1 and 2.

Shown are an oil pump 21, a primary regulator valve 23, a secondary regulator valve 27, a throttle valve 29 which is a signal pressure valve, a manual valve 33, a 1-2 shift valve 34, a 2-3 shift valve 36, a low coast modulator valve 38, a second range boost valve 40, an orifice control valve 42, a lock-up relay valve 44, a B-1 accumulator 48, a C-1 accumulator 46, a cooler by-pass valve 50, flow rate control valves 51, 52, 53, 54 each comprising a check valve and an orifice in parallel, a 1-2 shift valve controlling solenoid valve S1, a 2-3 shift valve controlling solenoid valve S2, a lock-up relay valve controlling solenoid valve S3, and an electronic control unit 60 for controlling the solenoid valves S1 through S3.

The orifice control valve 42 and the flow rate control valve 52 are disposed in a line which communicates the first hydraulic servo C-2 with the third hydraulic servo b2 in this embodiment. The orifice control valve 42 and the flow rate control valve 52 form a communication control valve mechanism 70 for controlling the communication degree between the first hydraulic servo C-2 and the third hydraulic servo b2 in response to the signal pressure from the throttle valve which is a signal pressure valve.

Described next will be the construction of each valve as well as the operation of the control system.

Oil pumped up from an oil reservoir (not shown) through an oil strainer 20 is introduced into a hydraulic circuit 1 by the oil pump 21.

The primary regulator valve 23 includes a spool 24 backed by a spring 231 in one direction (downwardly in the drawing), and a regulator plunger 25 disposed in series with the spool 24. The regulator plunger 25 has a large-diameter land 253 which receives the throttle pressure of an oil line 5, described below from the line 5A communicated with the line 5 and 3B via a shattle valve 55, or the second range boost pressure of a hydraulic line 3B, described below, and a small-diameter land 253 which receives line pressure, described below, from an oil line 9. The spool 24 is urged upwardly in the drawing in accordance with these input hydraulic pressures (line pressure and throttle pressure). The spool 24 receives feedback of output hydraulic pressure (line pressure) applied from above to an upper land 241 through an orifice 232, as well as the load applied by the spring 231 and the pushing force applied by the regulator plunger 25, these being applied from below. In response, the spool 24 is displaced to regulate the opening areas of a port 233 communicating with the oil line 1, an outport 234 communicating with an oil line 7, and a drain port 235. The hydrauic pressure of the oil line 1 is regulated in accordance with the oil pump discharge pressure and input hydraulic pressure and, hence, is converted into line pressure. In addition, surplus oil is supplied into the oil line 7, and further excess oil is discharged into the oil strainer 20 from an oil line 8. Thus, the line pressure PL is generated in the oil line 1, which line pressure is regulated in accordance with the vehicle running conditions such as vehicle speed and throttle opening. It should be noted that the oil line 1 and the oil line 7 are communicated also by an orifice 236, so that the minimum necessary amount of oil is supplied to the oil line 7 irrespective of the position of the spool 24.

The secondary regulator valve 27 includes a spool 28 backed by a spring 271 in one direction (downwardly in the drawing). The spool 28 receives, from one direction, the load applied by the spring 271 and the throttle pressure applied through an oil line 9, as well as the hydraulic pressure of the oil line 7 applied, from the other direction, to an upper land 281 as feedback through an orifice 272. In response, the spool 27 is displaced to regulate the opening area of a port 273 communicating with the oil line 7, and the opening area of a drain port 275 communicating with an oil line 11, thereby generating a secondary line pressure in the oil line 7, supplying surplus oil as lubricating oil from an oil line 10 to portions requiring lubrication, and discharging further excess oil into the oil strainer 20 from an oil line 11. It should be noted that the lubricating oil supply line 10 is communicated also with the oil line 7 by an orifice 276, so that the minimum necessary amount of lubricating oil is supplied to the oil line 10 irrespective of the position of the spool 28. This prevents the seizing of portions requiring lubrication.

The throttle valve 29 includes a spool 30 backed by a spring 291 in one direction (upwardly in the drawing), a throttle plunger 31 disposed in series with the spool 30 through an intermediate spring 292, a throttle cam 32 for displacing the throttle plunger 31 in accordance with the engine throttle opening, and a stopper plate 293 for limiting the amount of displacement of the spool. The throttle plunger 31 receives feedback of the throttle pressure in the oil line 9, as well as a pushing force applied by the cam 32 coupled to the throttle pedal through a link mechanism (not shown) and rotated by an amount corresponding to the amount by which the pedal is depressed. In response, the throttle plunger 31 is displaced upwardly in the drawing to press the spool 30 through the intermediate spring 292. The spool 30 receives, from above, the spring load of the spring 291 and the throttle pressure feedback of the oil line 9, as well as a pushing force applied from below by the intermediate spring 292. In response, the spool 30 is displaced to regulate the opening area of an inport 294 communicating with the oil line 1, and the opening area of a drain port 295, thereby producing throttle pressure in the oil line 9. The throttle pressure, which is one of the signals related to the output of the engine, increases in accordance with the increase in the throttle opening. When a signal hydraulic pressure which increases in accordance with vehicle speed (or the rotating speed of the output shaft 142) is applied to a chamber (a chamber accommodating the spring 291) at the upper end of the throttle valve 29 shown in FIG. 3, a throttle hydraulic pressure can be produced which increases in accordance with the increase in the throttle opening, and which decreases in accordance with the increase in vehicle speed (or the rotating speed of the output shaft 142).

The manual valve 33 includes a spool 331 moved manually by a shift lever (not shown) provided at the driver's seat. As shown in Table 1, the oil line 1 generating the line pressure is communicated with the oil lines 2 through 6 in manner depending upon the position at which the shift lever is set (the set range). These positions are P (park), R (reverse), N (neutral), D (drive), 2 (second) and L (low). The oil line 2 is communicated with the hydraulic servo C-1 of the forward clutch C1 through a flow rate control valve 51 and the accumulator 46 provided downstream of the control valve, and supplies control pressure to the lock-up relay valve 44. The oil line 3 supplies line pressure to the 1-2 shift valve 34 and second range shift booster valve 40. The oil line 4 supplies line pressure to the 2-3 shift valve 36 and control pressure to the second range booster valve 40. The oil line 5 supplies control pressure to the 2-3 shift valve 36, the low coast modulator valve 38 and the throttle valve. The oil line 6 supplies line pressure to the 1-2 shift valve 34.

TABLE 1

| | COMMUNICATION WITH LINE 1 | | | | |
|---|---|---|---|---|---|
| | Line 2 | Line 3 | Line 4 | Line 5 | Line 6 |
| P | X | X | X | X | O |
| R | X | X | X | O | O |
| N | X | X | X | X | X |
| D | O | O | O | X | X |
| 2 | O | O | X | X | X |
| L | O | X | X | X | O |

The electronic control unit 60 comprises means for sensing the vehicle running conditions, such as a vehicle speed sensor, a throttle opening sensor, a detector for detecting the set positions of the manual valve 33 and a switch for selecting either one of automatic and manual shifting modes, and generates an output for controlling the solenoid valves S1, S2 and S3 in response to input signals (vehicle running conditions) from the sensors or the switch.

The driver, by selectively turning on an automatic shifting switch and a manual shifting switch, causes the vehicle to run in the automatic transmission mode or in a specific shift range, as shown in Table 2 below, with respect to the manual valve setting position, namely D, 2nd and L. Setting the automatic shifting running mode or manually selected shift range running mode is performed by the electronic control unit 60, which receives inputs from the automatic shifting switch and manual shifting switch. The electronic control circuit 60, in response to these input signals, produces outputs in such a manner that the solenoid valves S1 and S2 are set to the automatic shifting position or specific shift range position, respectively.

TABLE 2

| | Automatic Shifting | Manual Shifting |
|---|---|---|
| D-range | 3rd ⇌ 2nd ⇌ 1st | 3rd |
| 2-range | 2nd ⇌ 1st | 2nd |
| L-range | 2nd ⇌ 1st | 1st |

The 1-2 shift valve 34 includes a spool 35 backed by a spring 341 in one direction (downwardly in the drawing). The spool 35 receives, from one direction, the spring load of the spring 341, and has an upper land 351 which receives, from the other direction, the hydraulic pressure of an oil line 1A communicating with the oil line 1 through an orifice 342 and having the electromagnetic solenoid valve S1 attached thereto. In response, the spool 35 is displaced. When the solenoid valve S1 is in the conductive state, the valve opening thereof is opened, pressure is discharged from the oil line 1A, an oil pressure P1 drops to a low level, and the spool 35 is set to the upward side, namely the 1st speed side, by the action of the spring 341. In consequence, an inport 343 communicating with the oil line 3 is closed, the oil line 6 is communicated with an oil line 3A, which communicates with the second hydraulic servo b1, on the engaging side, provided in the hydraulic servo mechanism B-1 of the 2nd speed brake B, and the drain port 344 is communicated with an oil line 6A communicating with the low coast modulator valve 38. When the manual valve 33 is set to each of the ranges D, N, R and P, the oil line 6 is communicated with the drain port 332 of the manual valve, as shown in FIG. 3. Accordingly, no hydraulic pressure is produced in the oil line 3A, and the brake B1 is released. When the solenoid valve S1 is in the non-conductive state, the valve opening thereof is closed, the hydraulic pressure P1 of the oil line A1 assumes a high level equivalent to the line pressure, and the spool 35 is set to the lower side, namely the 2nd speed side. In consequence, the oil line 3 is communicated with the oil line 3A, which communicates with the second hydraulic servo b1, on the engaging side, provided in the hydraulic servo mechanism B-1 of the 2nd speed brake B1, and the oil line 6 is communicated with the oil line 6A communicating with the low coast modulator valve 38. Further, the second hydraulic servo b1 of the hydraulic servo mechanism B-1 is supplied with line pressure through the flow rate control valve 53 provided in the oil line 3A, and the accumulator 48 provided downstream of the control valve 53. Thus, the brake B1 is engaged.

The 2-3 shift valve 36 includes a spool 37 backed by a spring 361 in one direction (downwardly in the drawing). The spool 37 receives, from one direction, the spring load of the spring 361 and the line pressure of the oil line 5 when this line pressure is produced in the oil line 5, the pressure acting upon a lower land 372, as well as the hydraulic pressure of the oil line 4A, this pressure acting upon an upper land 371 from the other direction. The oil line 4A communicates with the oil line 4 through an orifice 360 and is provided with the electromagnetic solenoid valve S2. The spool 37 is displaced in response to these forces. When the solenoid valve S2 is in the conductive state, the hydraulic pressure P2 of the oil line 4A assumes a low level, as in the case of the 1-2 shift valve. Therefore, the spool 37 is set to the upward side (2nd speed side), so that communication between the oil line 4 and the oil line 4B, which communicates with the clutch C2, is cut off. When the solenoid valve S2 is in the non-conductive state, the spool 37 is set to the lower side (3rd speed side), the oil line 4 is communicated with the oil line 4B, and the line pressure of oil line 4 is communicated to the hydraulic servo C-2 of the clutch C2 through the flow rate control valve 54. Also, the hydraulic servo (exhaust chamber) b2 on the release side of the hydraulic servo mechanism B-1 of brake B1 is supplied with line pressure through the flow rate control valve 52. As a result, the clutch C2 is engaged and the brake B1 is released. Further, when line pressure is being produced in the oil line 5 (i.e., when the manual valve is set to the L position), the spool is positioned upwardly (2nd speed side) by the line pressure acting on the lower land 372 and the spring load of the spring 361.

The low coast modulator valve 38 includes a spool 39 is backed by a spring 381 in one direction, and receives, from one direction, the spring load of the spring 381 and the line pressure produced in the oil line 5 and, from the other direction, the output hydraulic pressure feedback acting upon a left land 382. The spool 39 is displaced in response to these forces. The low coast modulator valve 38 has an inport 383 communicating with the oil line 6A, an outport 385 communicating with an oil line 6B, which communicates with the hydraulic servo B-2 of the brake B2, and a drain port 387, and responds to displacement of the spool 39 to regulate the opening area of the in port 383 and drain port 387. Thus, line pressure supplied from the oil line 6A is regulated before being delivered to the oil line 6B. The oil lines 6A, 6B are communicated through the low coast modulator valve 38 and through a check valve 380, with the discharge of oil from the oil line 6B to the oil line 6A proceeding rapidly through the check valve 380.

The 2nd range shift valve 40 includes a spool 41 backed by a spring 401 in one direction. The spool 41 receives, from one direction, the spring load applied by the spring 401, and has a right land 411 which receives the line pressure of the oil line 4 applied from the other direction, the spool 41 being displaced as a result. When the manual valve 33 is at a set position other than the D range and line pressure is not being supplied to the oil line 4, the spool 41 is set to the right side by the action of the spring 401, and the oil line 3 is communicated with the oil line 3B, which communicates via the three-way valve 55 with an input oil line 9A to the plunger 25 of the primer regulator valve 23. As a result, when the driver selects manual shifting, sets the manual valve 33 to 2nd and effects travel in the 2nd speed, the output line pressure of the primer regulator valve is raised in level by the line pressure input from the oil line 5A. In comparison with starting motion in the first speed, the torque capacity of the servo C-1 and the hydraulic servo mechanism B-1 of the clutch C1 and brake B1 are increased in accordance with an increase in the transfer torque accompanying start of motion at a low reduction ratio. Hence, starting motion in 2nd speed takes place smoothly. When the manual valve 33 is set to the D range, the oil line 4 is supplied with line pressure, the spool 41 is set to the left side, and the oil line 3B is communicated with the drain port 402 to effect drainage.

As a result of the foregoing, the primary regulator valve 23 has no input of line pressure from the oil line 9A, so that ordinary line pressure (line pressure without a raise in level) is established and an unnecessary increase in torque capacity is prevented at the time of automatic shifting when the manual valve is in the D range. There is also no increase in shock at the time of automatic shifting.

In the control unit 70 for controlling the communication between the first and third hydraulic servos C-2 and b2, the orifice control valve 42 includes a spool 43 backed by a spring 421 in one direction. The spool 43 receives, from one direction, the spring load applied by the spring 421 and, from the other direction, the throttle pressure of the oil line 9, which is applied to a right land 431, and is displaced by these forces. Thus, communication whether or not via the flow rate control valve 52 is switched between an oil line 4B and an oil line 4C, the latter communicating with the third hydraulic servo (exhaust chamber) b2 on the release side of the hydraulic servo of brake B1. (The oil lines 4B and 4C are mutually communicated via the flow rate control valve 52 connected in parallel with the orifice control valve 42.) In other words, when the throttle pressure of the oil line 9 is greater than a set value, the communication between oil line 4B and oil line 4C is cut off and, when the throttle pressure is below the set value, communication is established between the oil line 4B and the oil line 4C.

In the case in which a signal hydraulic pressure $P_v$, which increases with an increase in the vehicle speed (or the rotational speed of the output shaft 142) can be introduced to a chamber 423 at the left end of the valve in FIG. 3 in which a spring 421 is disposed, so that the spool is displaced in a left or right direction in FIG. 3 in response to the increase in throttle opening or the vehicle speed (or rotational speed of the output shaft 142), respectively. Accordingly the communication and cutoff between the lines 4B and 4C is switched over by the pressure difference between the throttle pressure and the signal pressure corresponding to vehicle speed.

In order to prevent or mitigate the shock which occures at the time of 3-2 kickdown shift, at least the output of the engine should be taken into consideration. It is preferable that the engagement of the brake B1 be achieved slowly or quickly when the throttle opening, i.e., one of the factors related with the engine output, is high or slow, respectively. The control valve unit 70 enables to control the engagement timing of the brake B1 in a most favorable manner.

If vehicle speed is further taken into consideration in addition to the engine output in order to set the engagement timing of the brake B1 for mitigating the shock at the time of 3-2 kickdown shift, better timing control could be provided. Specifically the brake B1 is engaged slowly when the vehicle speed is low and the throttle opening is high and is engaged rapidly when the vehicle speed is high and the throttle opening is low. In order to accomplish this, a signal hydraulic pressure which is increased with the increase in a vehicle speed (or rotational speed of the output shaft 142) is introduced to the left end chamber 423 of the orifice control valve 42 in which a spring 421 is disposed as shown in FIG. 3.

Alternatively it is preferable that the throttle pressure be increased with the increase in the throttle opening as mentioned-above and be decreased with the increase in the vehicle speed (or rotational speed of the output shaft 142). The hydraulic servo C-2 of the clutch C2 is supplied with the hydraulic pressure which has been drained from the brake B1 of the double piston type. The orifice control valve 42 sets the engagement timing of the brake B1 by adjusting exhausting from the clutch C2 in response to also the vehicle speed. The spool 43 of the orifice control valve 42 is positioned at the left position to cut off the communication between the lines 4B and 4C when the vehicle speed is slow and the throttle pressure is not lower than a preset value. The pressure in the third hydraulic servo b2 for the brake B1 thereby gradually exhausted via the line 4C, the flow rate control valve 52, the line 4B, 2-3 shift valve 36, the line 5, the manual valve 33, and the drain port 332. The spool 43 is positioned rightwardly to communicate the line 4B with the line 4C when the vehicle speed is high and the throttle pressure is not higher than the preset value. Accordingly the hydraulic pressure in the third hydraulic servo b2 is rapidly exhausted via the line 4C, the orifice control valve 42, the line 4B, the 2-3 shift valve 36, the line 5, the manual valve 33 and the drain port 332. The engagement of the brake B1 is carried out at an shorter timing when the vehicle speed is high and the throttle opening is low. The engagement of the brake B1 is carried out at a slower timing when the vehicle speed is low and the throttle opening is high. Thus the flow rate control valve 52 and the orifice control valve 42 form the control valve unit 70 for controlling the communication between the first hydraulic servo C-2 and the third hydraulic servo b2 (the communication degree between two hydraulic servos and the drain port in the present embodiment) so that the timing of the engagement of the brake B1 which is a frictional engaging device is appropriately controlled.

We have described the embodiment in which only one pair of an orifice control valve and a flow rate control valve is used. Alternatively a plurality of pairs of a flow rate control valve and an orifice control valve having a spring constant different from those of the other valves may be disposed in a parallel relatoship with each other to change the speed of the exhausting from the third hydraulic servo b2 in 3-stepwise or by more steps in response to the throttle pressure.

The lockup relay valve 58 comprises a spool 59 which is normally biased by a spring 581. The spool 59 is displaced by being subjected to an upward force exerted by the spring 581 and a downward force exerted by a solenoid pressure applied upon the upper end land 591, the solenoid pressure being controlled by a lockup solenoid valve S3. The lockup solenoid valve S3 is disposed in the line 2A which is communicated with the line 2 via the orifice 580.

The relations between the operation of the solenoid valves S1, S2 and S3, the clutches C1, C2, the brakes B1, B2 and a one-way clutch F1 and the shift lever positions P, R, N, D. 2 and L are shown in Table 3.

TABLE 3

|  |  | S1 | S2 | S3 | C1 | C2 | B1 | B2 | F1 |
|---|---|---|---|---|---|---|---|---|---|
| P |  | X | X | X |  |  |  | O |  |
| R |  | X | X | X |  | O |  | O |  |
| N |  | X | X | X |  |  |  |  |  |
| D | 3rd | X | X | ⊙ | O | O |  |  |  |
|  | 2nd | X | O | ⊙ | O |  | O |  |  |
|  | 1st | O | O | ⊙ | O |  |  |  | O |
| 2 | 2nd | X | X | ⊙ | O |  | O |  |  |
|  | 1st | O | X | ⊙ | O |  |  |  | O |
| L | 1st | X | X | ⊙ | O |  | O |  |  |

In Table 3, X represents an OFF state of the solenoid valves, O represents an ON state of the solenoid valve, thereby indicating engagement of the clutch brake or locking of the one-way clutch, respectively, and ⊙ indicates engagement of a direct coupling clutch.

(A) When the manual valve 33 is set at P range position the electronic control unit 60 generates a signal to turn off all solenoid valves S1 to S3 as shown in Table 3 so that the line 1 is communicated with the line 6 as shown in Table 1. The hydraulic servo B-2 of the brake B2 is supplied with the hydraulic fluid via the line 6, the 1-2 shift valve 34, the line 6A, the 2nd coast modulator valve 38, and the line 6B so that the brake B2 is engaged, which engagement causes the carrier 165 of the second planetary gear set 160 to lock to the automatic transmission casing 100 for locking the shaft.

(B) When the manual valve 33 is set at R range, the electronic control 60 turns off the all solenoid valves S1-S3 as shown in Table 3. The line 1 is communicated with the lines 5 and 6.

The hydraulic servo C-2 is supplied with the line pressure via the line 5, the 2-3 shift valve 36 and the line 4B by the supply of the line pressure to the line 5 so that the clutch C2 is engaged to achieve the gear train for the reverse movement. The regulator valve is supplied with the line pressure via the line 5, the three-way check valve 55, and the line 5A to level up the line pressure.

(C) P-R shift

In this time a P-R shift signal is input to the electronic control unit 60, which in turn generates a signal to turn on the solenoid valve S1 for a given time (for example one second). This causes the line 6 to temporarily communicate with the line 3A. The second hydraulic servo b1 of the hydraulic servo mechanism B-1 of the brake B1 is supplied with the line pressure to temporarily engage the brake B1. Accordingly the brake drum 172 is temporarily locked to the automatic transmission case 100 by the brake B1. The hydraulic fluid in the second hydraulic servo b1 is exhausted via the line 3A, the 1-2 shift valve 34, the line 3 and the drain port 333 of the manual valve 33 on termination of the turn-on signal to the solenoid valve S1 from the electronic control unit 60. The disengagement of the brake B1 is smoothly carried out by the action of the return spring 178. On the time of P-R shift the brake B1 is first engaged due to the presence of flow rate control valve 54. Then the clutch C2 is engaged and the brake B1 is being gradually disengaged for achieving the reverse movement. The P-R shock due to the engagement of the clutch is prevented.

(D) N position (neutral)

When the manual valve 33 is positioned at N position the elctronic control unit 60 generates a signal to turn off all the solenoid valves S1, S2 and S3 as shown in Table 3. The line 1 is communicated with none of the lines 2 to 6 as shown in Table 1 so that the clutches C1 and C2 and brake B1 and B2 are disengaged. Accordingly the automatic transmission is in a condition where the input shaft is disconnected with the output shaft.

(E) D position (drive)

When the manual valve 33 is positioned at D position, the line 1 is communicated with lines 2 to 4 as shown in Table 1. Accordingly the clutch C1 is engaged by supplying the line pressure to the hydraulic servo C-1 of the forward clutch C1 from the line 2. The automatic or manual shifting mode is selectable:

(a) Automatic shifting mode (by manual selection)

Both solenoid valves S1 and S2 are turned on at starting. This causes both the spools 35 of the 1-2 shift valve and the spool 37 of the 2-3 shift valve to position at upper position. The hydraulic servos of the clutch C2 and the brakes B1 and B2 are drained to make it possible to start and running at the first speed. The electronic control unit 60 receives signals from the vehicle speed sensor, the throttle opening sensor, the detector for detecting the preset positions of manual valves and the switch for switching the automatic or manual transmission to generate a signal to turn off the solenoid valve S1 and to turn on the solenoid valve S2 when the vehicle speed and throttle opening fall in a set range for the second speed running. This causes the brake B1 to engage to establish the second speed. The electronic control 60 generates a signal to turn off both solenoid valves S1 and S2 when the vehicle speed and throttle opening fall in a set range for the third speed running. This causes the clutch C2 to engage and the brake B1 to disengage to attain the third speed.

(b) Manual shifting mode (by manual selection)

The electronic control unit 60 turns off both the solenoid valves S1 and S2 to lock the automatic transmission to the third speed.

(F) Position 2

When the manual valve 33 is set at position 2 the automatic or the manual shifting mode is selectable:

(a) Automatic shifting mode

The line 1 is communicated with the lines 2 and 3 and the line 4 to drain.

When the vehicle speed and the throttle opening are in a first speed running range the solenoid valves S1 and S2 are turned on and off respectively as shown in Table 3. The first speed gear train in which only clutch C1 is engaged is achieved. The up shift to the second speed gear ratio is achieved by turning off both the solenoid valves S1 and S2 to engage the brake B1. Since the line 4 is drained the spool 37 of the 2-3 shift valve is at upper position so that the up shift to the third speed is not achieved.

(b) Manual shifting mode

Both the electromagnetic solenoid valves S1 and S2 are turned off to lock to the second speed gear ratio irrespective of the vehicle speed and the throttle opening.

(G) Position L

When the manual valve 33 is set at position L, the line 1 is communicated with the lines 2 and 6. Both the electromagnetic solenoid valves S1 and S2 are turned off irrespective of the selection of the automatic/manual shifting modes. The clutch C1 and brake B2 are engaged to carry out the first speed range. The solenoid valve S3 is turned on to engage the lockup clutch 135 when the manual valve 33 is set to D and 2 ranges and the difference between the rotational speeds of the input and output shafts of the torque convertor is not higher than a given value.

Figure 4:
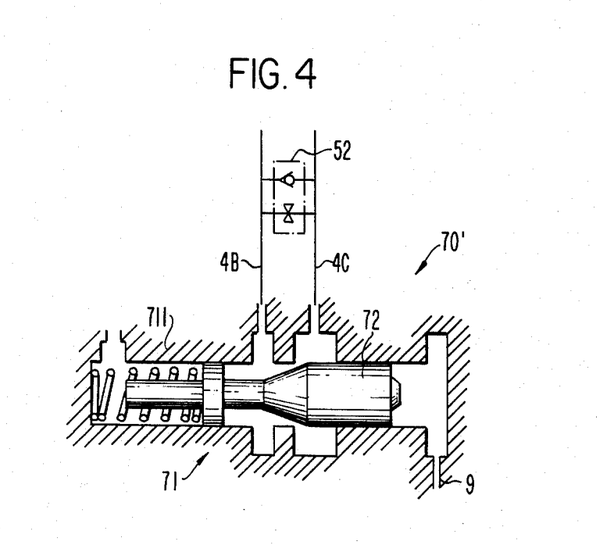
FIGS. 4 and 5 are partially sectional views showing a communication control valve in the hydraulic circuit shown in FIG. 3.
Figure 5:
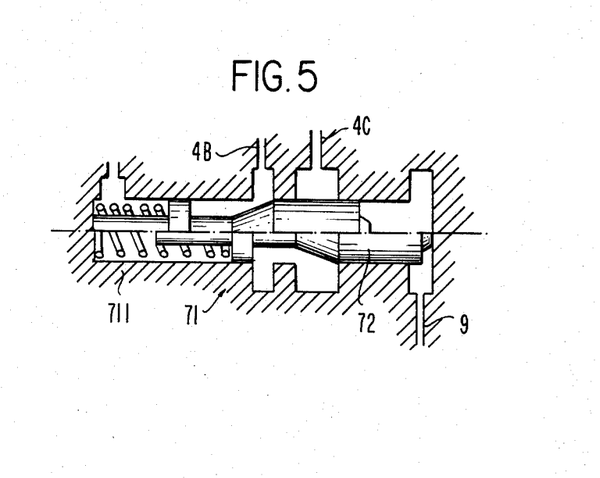

Another embodiment is shown in FIGS. 4 and 5.

In this embodiment, the control valve 70' relevant to the valve 42 is adapted to continuously change the degree of the communication between the lines 4B and 4C in response to hydraulic pressure related with the engine output such as the throttle pressure. The control valve 71 includes a spool 72 which is backed by a spring 711 and is applied with the hydraulic pressure in one direction against the spring force. The valve 71 is so designed that the area of the communication passage in the valve is continuously changed in response to the displacement of the spool 72. Specifically the shoulder of the land is tapered so that the gap between the land and the inner wall of the valve cylinder between the ports communicated with the lines 4B and 4C is linearly changed from a full opening position (a lower half portion) to a completely closed position (an upper half portion) as shown in FIG. 5. Accordingly the valve 71' controls the flow rate of the operating fluid in the third hydraulic servo b2 which is discharged to the line 4B from the line 4C via the valve 71'.

Alternatively provision of the inner wall of the valve cylider with a tapered area is applicable to continuously change the communication degree between the lines 4B and 4C. In this case a flow rate control valve 52 may be disposed between the lines 4B and 4C.

What is claimed is:

1. A system for hydraulically controlling an automatic transmission equipped with a gear mechanism having elements and a plurality of friction engaging means therefor for attaining a plurality of shift ranges by locking and releasing at least one of the elements of the gear mechanism, which is disposed between an input shaft and an output shaft, to and from a case, by bringing the elements into and out of engagement with one of the input shaft, the output shaft, and each other, comprising:

a first and a second friction engaging means which take part in achieving at least two speed ranges comprising a higher speed range and a lower speed range;

the first friction engaging means taking part in achieving a gear train of the higher speed range between said input and output shafts, and the second friction engaging means taking part in achieving a gear train of the lower speed range;

a first and a second hydraulic servo means for actuating the first and the second friction engaging means, respectively;

a third hydraulic servo means which is disposed to act opposing to said second hydraulic servo means and is communicated with the first hydraulic servo means;

a hydraulic pressure source for generating a hydraulic pressure;

a regulator valve for regulating the hydraulic pressure from the hydraulic pressure source into a given pressure;

a first signal hydraulic pressure valve for generating a first signal pressure related with the operation conditions of an engine for driving said input shaft, said conditions including at least output of the engine;

shifting valves for selectively supplying the hydraulic pressure from the regulator valve to respective servo means of said friction engaging means;

a hydraulic line communicating the first hydraulic servo means with the third hydraulic servo means;

a communication control valve means, disposed in said hydraulic line, for controlling the communication therebetween in response to at least the first signal pressure;

said communication control valve means includes an orifice control valve and in parallel therewith a flow rate control valve means;

said orifice control valve comprising a valve cylinder, two ports each being communicated with the first and second servo means, respectively, a spool slidably disposed in the cylinder to control the communication between said two ports, a first chamber receiving the first signal pressure related with the throttle opening adapted to urge the spool to interrupt communication between said two ports as the first signal increases, and a second chamber receiving a second signal pressure related with vehicle speed applicable upon said spool against the first signal pressure; and said flow rate control valve means comprising in parallel an orifice and a check valve which allows the fluid only to flow from the first servo to the third servo, wherein the lower the first signal pressure and the higher the second signal pressure the more quickly is the second friction engaging means engaged upon downshifting from the higher speed range to the lower speed range.

2. The system as defined in claim 1, wherein the first signal pressure is such that it increases as the throttle opening increases, and the second signal pressure is such that it increases as the vehicle speed increases.

3. The system as defined in claim 1, in which the communication between said two ports is controlled to be closed or opened.

4. The system as defined in claim 1, in which the degree of the communication between said two ports is continuously varied with the spool displacement.

5. The system as defined in claim 4, in which a portion of the spool related to control said two ports is tapered.

6. The system as defined in claim 4, in which the inner wall of the valve cylinder between said two ports is tapered.

7. The system as defined in claim 1, in which the third hydraulic servo is provided as an exhaust chamber for the second servo.

* * * * *